(12) United States Patent
Jiang

(10) Patent No.: US 12,547,553 B2
(45) Date of Patent: Feb. 10, 2026

(54) METHOD OF OPERATING A MEMORY CONTROLLER, A MEMORY CONTROLLER AND A MEMORY SYSTEM

(71) Applicant: YANGTZE MEMORY TECHNOLOGIES CO., LTD., Wuhan (CN)

(72) Inventor: Qiang Jiang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 254 days.

(21) Appl. No.: 18/528,308

(22) Filed: Dec. 4, 2023

(65) Prior Publication Data
US 2025/0077443 A1 Mar. 6, 2025

(30) Foreign Application Priority Data
Sep. 5, 2023 (CN) .......................... 202311153969.8

(51) Int. Cl.
*G06F 12/14* (2006.01)
*G06F 21/79* (2013.01)

(52) U.S. Cl.
CPC ...... *G06F 12/1408* (2013.01); *G06F 12/1475* (2013.01); *G06F 21/79* (2013.01)

(58) Field of Classification Search
CPC ... G06F 12/1408; G06F 12/1475; G06F 21/79
See application file for complete search history.

(56) References Cited

U.S. PATENT DOCUMENTS

| 8,171,309 B1 * | 5/2012 | Poo ..................... G06F 11/3648 713/192 |
| 10,997,297 B1 * | 5/2021 | Lin .......................... H04L 9/30 |
| 2005/0021968 A1 * | 1/2005 | Zimmer ................ G06F 21/572 713/176 |

* cited by examiner

*Primary Examiner* — Shanto Abedin
(74) *Attorney, Agent, or Firm* — Conley Rose, P.C.

(57) ABSTRACT

The present disclosure provides a method of operating a memory controller, a memory controller, and a memory system, and relates to the technical field of memories. The memory controller includes an Advanced Encryption Standard (AES) engine, a processor, and a first interface, and the memory controller is communicatively connected with a first memory through the first interface. The method includes: in response to the memory controller being powered on, obtaining, by the processor, firmware from the first memory through the first interface, wherein the firmware includes a configuration information ciphertext of a first trusted computing group (TCG); and decrypting, by the AES engine, the configuration information ciphertext of the first TCG based on a first key and a preset decryption algorithm, to obtain a configuration information plaintext of the TCG.

20 Claims, 6 Drawing Sheets

---

IN RESPONSE TO THE MEMORY CONTROLLER BEING POWERED ON, OBTAIN, BY A PROCESSOR, FIRMWARE FROM A FIRST MEMORY THROUGH A FIRST INTERFACE, WHEREIN THE FIRMWARE COMPRISES A CONFIGURATION INFORMATION CIPHERTEXT OF A FIRST TRUSTED COMPUTING GROUP (TCG) — 501

DECRYPT, BY AN AES ENGINE, THE CONFIGURATION INFORMATION CIPHERTEXT OF THE FIRST TCG BASED ON A FIRST KEY AND A PRESET DECRYPTION ALGORITHM, TO OBTAIN A CONFIGURATION INFORMATION PLAINTEXT OF THE TCG — 502

METHOD OF OPERATING A MEMORY CONTROLLER, A MEMORY CONTROLLER AND A MEMORY SYSTEM

CROSS-REFERENCE TO RELATED APPLICATIONS

The present application claims priority to Chinese Patent Application No. 2023111539698, which was filed Sep. 5, 2023, is titled "OPERATING METHOD OF MEMORY CONTROLLER, MEMORY CONTROLLER AND MEMORY SYSTEM," and is hereby incorporated herein by reference in its entirety.

TECHNICAL FIELD

The present disclosure relates to the technical field of memories, and particularly to a method of operating a memory controller, a memory controller, and a memory system.

BACKGROUND

Firmware is a program that is stored in a memory and may be upgraded through a specific refresh program by a client. The firmware typically takes on the foundation and underlying work in apparatuses such as personal computers, mobile phones, Global Positioning System (GPS) terminals, and digital satellite receivers, etc. Updating or upgrading of the firmware refers to a process of writing new firmware to the memory to replace the original firmware.

In recent years, attacks on the client have gradually transferred from upper-layer software to underlying firmware, and a third party is likely to obtain relevant information in the firmware which is supposed to be obtained only by a person with relevant authorities, which may cause an immeasurable consequence.

SUMMARY

Examples of the present disclosure provide a method of operating a memory controller, a memory controller, and a memory system, to improve the safety of firmware.

In order to achieve the above purpose, the examples of the present disclosure employ the following technical solutions.

In a first aspect, a method of operating a memory controller is provided; the memory controller comprises an Advanced Encryption Standard (AES) engine, a processor, and a first interface; the memory controller is communicatively connected with a first memory through the first interface, and the method comprises: in response to the memory controller being powered on, obtaining, by the processor, firmware from the first memory through the first interface, wherein the firmware comprises a configuration information ciphertext of a first trusted computing group (TCG); and decrypting, by the AES engine, the configuration information ciphertext of the first TCG based on a first key and a preset decryption algorithm, to obtain a configuration information plaintext of the TCG.

In the method of operating the memory controller provided by the above examples of the present disclosure, configuration information of the first TCG in the firmware is stored in the first memory in a form of a ciphertext, and when the firmware needs to be loaded and run, the configuration information ciphertext of the first TCG in the firmware is decrypted based on the first key and the preset decryption algorithm, to obtain the configuration information plaintext of the TCG. Thus, a person without relevant authorities cannot directly obtain the configuration information of the first TCG in the firmware, so that the safety of the firmware is improved.

In some examples, the memory controller further comprises a second memory, and the method further comprises: storing, by the processor, the firmware in the second memory, and determining, by the AES engine, the configuration information ciphertext of the first TCG from the second memory based on a logical address corresponding to the configuration information ciphertext of the first TCG.

In these examples, in order to improve the safety of the firmware, the configuration information of the first TCG is loaded into the second memory in a form of a ciphertext. When the firmware is loaded and run by the processor, the configuration information ciphertext of the first TCG should be decrypted first. Thus, the configuration information ciphertext of the first TCG may be determined through the logic address corresponding to the configuration information ciphertext of the first TCG, so as to decrypt the configuration information ciphertext of the first TCG.

In some examples, the decrypting, by the AES engine, the configuration information ciphertext of the first TCG based on the first key and the preset decryption algorithm, to obtain the configuration information plaintext of the TCG comprises: performing, by the AES engine, an operation on the configuration information ciphertext of the first TCG through an AES decryption function by using the first key to obtain the configuration information plaintext of the TCG.

In these examples, the preset encryption algorithm may comprise a symmetric encryption algorithm, and the configuration information plaintext of the TCG may be obtained by inputting the first key and the ciphertext as input parameters into the AES decryption function. Thus, the safety of the firmware is improved.

In some examples, the memory controller further comprises a third memory in which the first key is stored, and the method further comprises: reading, by the processor, the first key from the third memory.

In these examples, the first key may comprise a private key or a public key, wherein the memory controller may encrypt and decrypt the configuration information plaintext of the TCG of the firmware in a public key-private key manner, and the memory controller may also encrypt and decrypt the configuration information plaintext of the TCG of the firmware in a public key-public key manner, both of which may improve the safety of the firmware.

In some examples, the method further comprises: in response to update of the configuration information plaintext of the TCG, encrypting, by the AES engine, the updated configuration information plaintext of the TCG based on a second key and a preset encryption algorithm, to obtain a configuration information ciphertext of a second TCG; and storing, by the processor, the firmware comprising the configuration information ciphertext of the second TCG to the first memory.

In these examples, the memory controller may encrypt the updated configuration information plaintext of the TCG based on the second key and the preset encryption algorithm, so that a person without relevant authorities may be prevented from directly obtaining the configuration information of the TCG in the firmware, thereby improving the safety of the firmware.

In some examples, the method further comprises: obtaining, by the processor, the firmware comprising the updated configuration information plaintext of the TCG from the second memory.

In some examples, the memory controller further comprises a third memory storing the second key, and the method further comprises: reading, by the processor, the second key from the third memory.

In these examples, the second key may comprise a public key, and the second key corresponds to the first key, e.g., the data encrypted by using the second key may be decrypted based on the first key. Thus, the safety of the firmware may be improved.

In some examples, the first memory comprises a non-volatile flash memory.

In a second aspect, a memory controller is provided; the memory controller comprises an Advanced Encryption Standard (AES) engine, a processor, and a first interface; and the memory controller is communicatively connected with a first memory through the first interface; and the processor is configured to: in response to the memory controller being powered on, obtain firmware from the first memory through the first interface, wherein the firmware comprises a configuration information ciphertext of a first trusted computing group (TCG). The AES engine is configured to: decrypt the configuration information ciphertext of the first TCG based on a first key and a preset decryption algorithm, to obtain a configuration information plaintext of the TCG.

In some examples, the memory controller further comprises a second memory, and the processor is further configured to: store the firmware into the second memory. The AES engine is further configured to: determine the configuration information ciphertext of the first TCG from the second memory based on a logical address corresponding to the configuration information ciphertext of the first TCG.

In some examples, the AES engine is further configured to: perform an operation on the configuration information ciphertext of the first TCG through an AES decryption function by using the first key, to obtain the configuration information plaintext of the TCG.

In some examples, the memory controller further comprises a third memory in which the first key is stored, and the processor is further configured to: read the first key from the third memory.

In some examples, the AES engine is further configured to: in response to update of the configuration information plaintext of the TCG, encrypt the updated configuration information plaintext of the TCG based on a second key and a preset encryption algorithm, to obtain a configuration information ciphertext of a second TCG. The processor is further configured to: store the firmware comprising the configuration information ciphertext of the second TCG to the first memory.

In some examples, the processor is further configured to: obtain the firmware comprising the updated configuration information plaintext of the TCG from the second memory.

In some examples, the memory controller further comprises a third memory in which the second key is stored, and the processor is further configured to: read the second key from the third memory.

In some examples, the first memory comprises a non-volatile flash memory.

In a third aspect, a memory system is provided, which comprises: the memory controller of the second aspect; and one or more first memories coupled with the memory controller.

In a fourth aspect, an electronic apparatus is provided, which comprises the memory system described above.

BRIEF DESCRIPTION OF THE DRAWINGS

To illustrate the technical solution in the present disclosure more clearly, the drawings to be used in some examples of the present disclosure will be briefly introduced below. The drawings in the following description are only drawings of some examples of the present disclosure. Those of ordinary skills in the art may also obtain other drawings according to these drawings. In addition, the drawings in the following description may be regarded as schematic diagrams, instead of limiting an actual size of a product, an actual flow of a method, an actual timing of a signal, etc. involved in the examples of the present disclosure.

DETAILED DESCRIPTION

Figure 1:
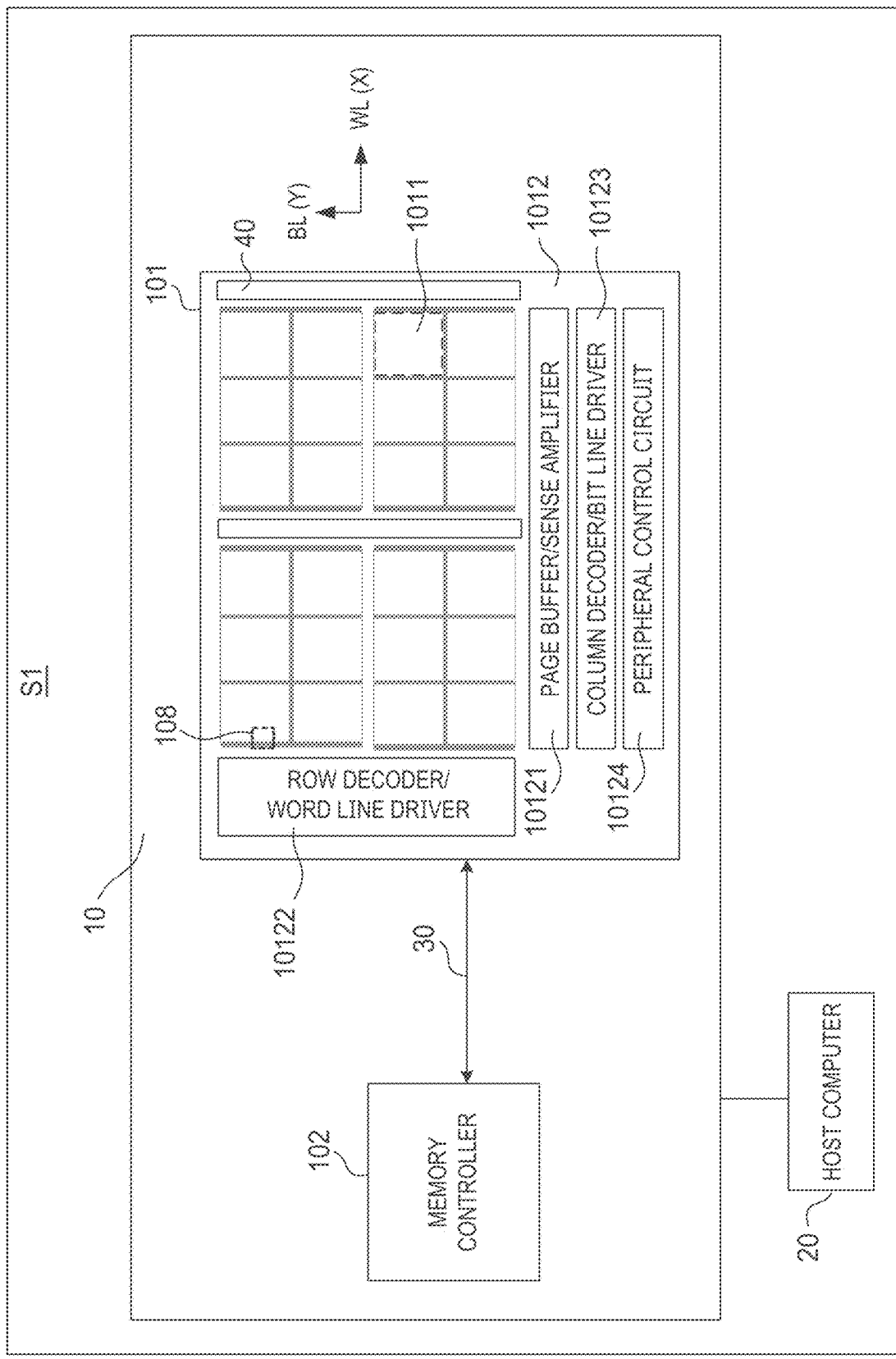
FIG. 1 is a schematic structural diagram of an example system S1 having a memory system 10 provided by examples of the present application.

The technical solutions in some examples of the present disclosure will be described below in conjunction with the drawings. The examples described are only part of, but not all of, the examples of the present disclosure. All other examples obtained by those of ordinary skills in the art based on the examples provided by the present disclosure should fall in the scope of protection of the present disclosure.

In the description of the present disclosure, the terms "center", "upper", "lower", "front", "rear", "left", "right", "vertical", "horizontal", "top", "bottom", "inner", "outer", etc. indicate orientations or position relationships that are based on the orientations or position relationships as shown in the drawings, and are only intended to facilitate description of the present disclosure and to simplify the description, instead of indicating or implying that a device or an element indicated must have a specific orientation or be constructed and operated in a specific orientation, and thus cannot be understood as limiting the present disclosure.

Unless otherwise specified in the context, throughout the specification and the claims, the term "comprise" is interpreted in an open and inclusive manner, e.g., "including, but not limited to". In the description of the specification, the terms "one example", "some examples", "an example", "in an example", or "in some examples" indicate that particular features, structures, materials, or characteristics related to the example are included in at least one example of the present disclosure. The schematic representation of the above terms may not necessarily refer to the same example. Furthermore, the particular features, structures, materials, or characteristics described may be included in any one or more examples in any suitable manner.

In the following, the terms "first" and "second" are only for the purpose of description, and cannot be construed as indicating or implying relative importance or implicitly indicating the number of indicated technical features. Thus, features defined by "first" and "second" may explicitly or implicitly include one or more of such features. In the description of the examples of the present disclosure, "a plurality of" means two or more, unless otherwise stated.

"At least one of A, B and C" and "at least one of A, B or C" have the same meaning, both including the following combinations of A, B and C: A alone, B along, C alone, a combination of A and B, a combination of A and C, a combination of B and C, and a combination of A, B and C. "A and/or B" includes the following three combinations: A alone, B alone, and a combination of A and B.

The use of "suitable for" or "configured to" herein means open and inclusive language, and does not exclude an apparatus suitable for performing or configured to perform additional tasks or operations.

In addition, the use of "based on" means openness and inclusiveness, as processes, steps, calculations, or other actions "based on" one or more of the described conditions or values may be based on an additional condition or exceed the described value in practice.

As used herein, the term "substrate" refers to a material onto which subsequent material layers may be added. The substrate itself can be patterned. Materials added onto the substrate can be patterned or can remain unpatterned. Furthermore, the substrate may include a variety of semiconductor materials, such as silicon, germanium, gallium arsenide, indium phosphide, etc. Alternatively, the substrate can be made from an electrically non-conductive material, such as a glass, a plastic, or a sapphire wafer, etc.

The term "three-dimensional memory" refers to a semiconductor device formed by memory cell transistor strings (referred to herein as "memory cell strings," such as NAND memory cell strings) that are arranged in an array on a main surface of a substrate or a source layer and extend along a direction perpendicular to the substrate or the source layer. As used herein, the term "vertical/vertically" means nominally perpendicular to the main surface (e.g., a lateral surface) of the substrate or the source layer.

When the memory system or some hardware in the memory system is started, the firmware needs to be loaded and run. For example, the firmware is an underlying application program or a driver program in the memory system. The firmware, which may be stored in a memory in an apparatus, is a program code arranged inside an integrated circuit and is responsible for controlling and coordinating the functions of the integrated circuit.

At present, the firmware is stored in the memory system in a form of a plaintext, and it is easy for a third party to obtain relevant information from the firmware, which is intended to be obtained only by a person with relevant authorities. After the relevant information is obtained, the content in the firmware may be tampered, which causes great potential vulnerabilities.

Thus, the examples of the present disclosure provide a method of operating a memory controller. In this method, configuration information of a first trusted computing group (TCG) of firmware is stored in a first memory in a form of a ciphertext, and when the firmware needs to be loaded and run, the configuration information ciphertext of the first TCG is decrypted based on a first key and a preset decryption algorithm to obtain a configuration information plaintext of the TCG. Thus, a person without relevant authorities cannot directly obtain the configuration information of the first TCG in the firmware, so that the safety of the firmware is improved.

For case of understanding, a memory system to which the method of operating the memory controller provided by the examples of the present application is applied is introduced below first.

As shown in FIG. 1, FIG. 1 is a schematic structural diagram of an example system S1 having a memory system 10 provided by examples of the present disclosure. The system S1 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having memory devices therein. The memory system 10 (which may also be referred to as a NAND memory system) comprises a memory 101 and a memory controller 102. The memory system 10 may communicate with a host computer 20 through the memory controller 102, wherein the memory controller 102 may be coupled to the memory 101 via a memory channel 30. In some examples, the memory 101 in the present disclosure may comprise a three-dimensional non-volatile memory, for example, a NAND flash memory that may also be referred to as a flash memory or NAND. Of course, the memory 101 in the present disclosure may also comprise other memories. The memory system 10 may have more than one memory 101, and each memory 101 may be managed by the memory controller 102.

In some examples, the host computer 20 may comprise a processor of an electronic apparatus, for example, a central processing unit (CPU), a system-on-chip (SoC), or an application processor (AP). The host computer 20 may transmit data to be stored at the memory system 10 or read data stored at the memory system 10.

The memory controller 102 may process input/output (I/O) requests received from the host computer 20, ensure data integrity and effective storage, and manage the memory 101. The memory channel 30 may provide data via a data bus and control communication between the memory controller 102 and the memory 101.

Further referring to FIG. 1, the memory 101 may be a memory chip (package), a memory die, or any portion of a memory die, and may comprise a plurality of memory blocks 1011. A size of the memory block 1011 may be of megabytes (MB), and the memory block 1011 is a minimum unit to carry out erase operations. Each memory block 1011 may comprise a plurality of memory cells, wherein each memory cell may be addressed by, for example, bit lines (BLs) and word lines (WLs). The bit lines and the word lines may be arranged vertically (for example, in rows and columns, respectively), thereby forming an array of metal lines. The directions of the bit lines and the word lines are labeled as "BLs" and "WLs", respectively, in FIG. 1. The one or more memory blocks 1011 may be also referred to as a "memory array" or an "array" in the present disclosure. The memory array is a core region in a memory apparatus that performs a storage function.

The memory 101 may further comprise a peripheral circuit region 1012. The peripheral circuit region 1012 (also referred to as a peripheral circuit) contains a number of digital, analog and/or mixed signal circuits (for example, a page buffer/sense amplifier 10121, a row decoder/word line driver 10122, a column decoder/bit line driver 10123, and a peripheral control circuit 10124), to support the function of the memory 101. The peripheral control circuit 10124 may comprise a register, an active and/or passive semiconductor apparatus, for example, a transistor, a diode, a capacitor, or a resistor, etc. The peripheral control circuit 10124 of the peripheral circuit region 1012 may be configured to initiate a program operation for a selected memory cell of the NAND memory string in the memory block 1011. In some implementations, the peripheral control circuit 10124 receives program commands from the memory controller 102 through an interface and, as a response, transmits control signals to the row decoder/word line driver 10122, the column decoder/bit line driver 10123, and a voltage generator (not shown in FIG. 1) disposed in the peripheral circuit region 1012, so as to initiate the program operation for the selected memory cell.

The layout of the electronic devices in the memory system 10 and the memory 101 in FIG. 1 is shown as an example. The memory system 10 and the memory 101 may have other layouts and may comprise additional devices. For example, the memory 101 may further comprise a high voltage charge pump, and an input-output circuit, etc. The memory system 10 may further comprise firmware, and a data scrambler, etc. In some examples, the peripheral circuit region 1012 and the memory array may be formed separately on separate wafers and connected with each other by wafer bonding.

Figure 3:
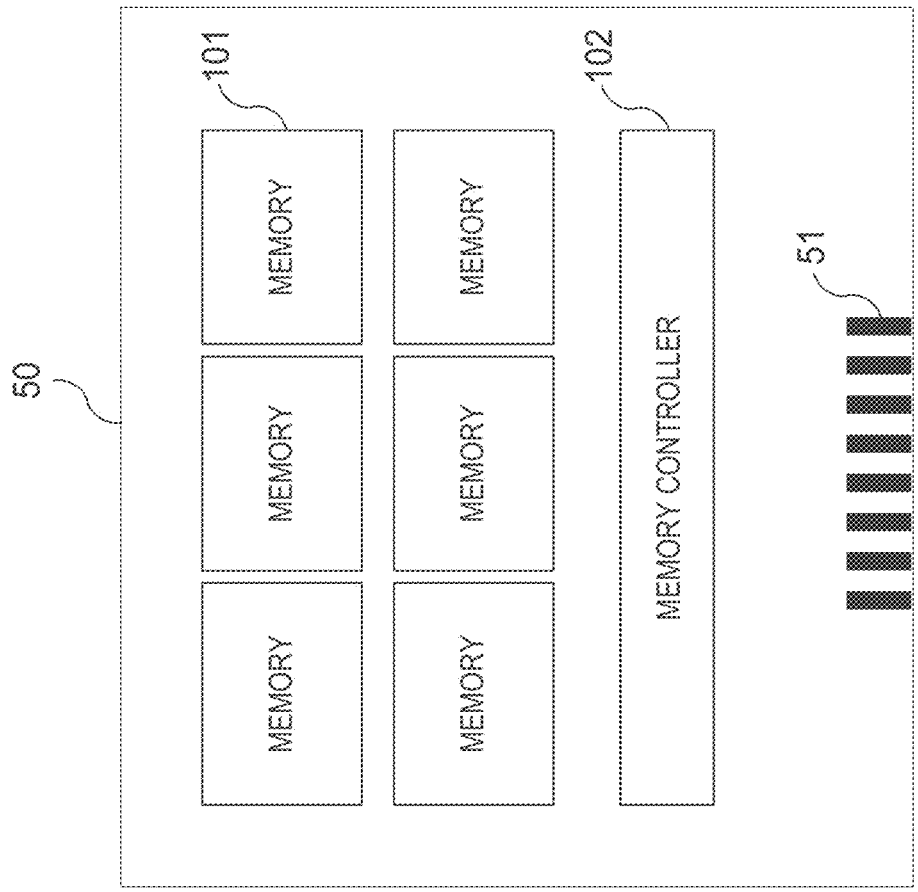
FIG. 3 is a schematic diagram of another memory card provided by examples of the present application.
Figure 2:
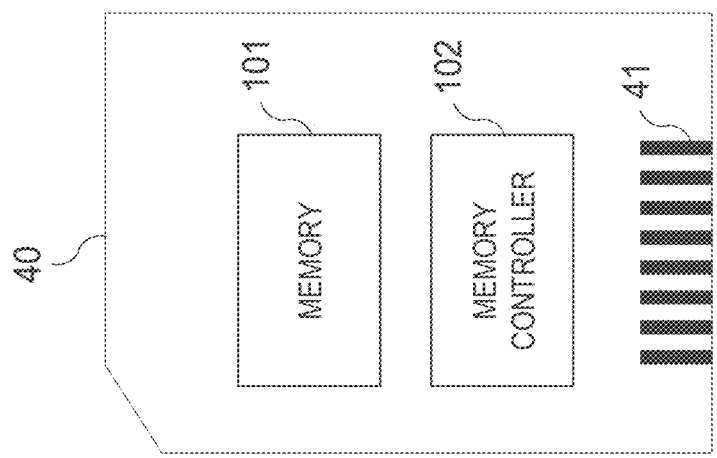
FIG. 2 is a schematic diagram of a memory card provided by examples of the present application.

The memory controller 102 and one or more memories 101 may be integrated into various types of memory apparatuses, for example, included in the same package, such as a Universal Flash Storage (UFS) package or an Embedded Multi Media Card (eMMC) package. That is, the memory system 10 may be implemented and packaged into different types of end electronic products. In one example as shown in FIG. 2, the memory controller 102 and a single memory 101 may be integrated into a memory card 40. The memory card 40 may comprise a Personal Computer Memory Card International Association (PCMCIA), a Compact Flash (CF) card, a Smart Media (SM) card, a memory stick, a Multimedia Card (MMC), a Secure Digital Memory Card (SD card), or UFS, etc. The memory card 40 may further comprise a memory card connector 41 coupling the memory card 40 with the host computer 20. In another example as shown in FIG. 3, the memory controller 102 and a plurality of memories 101 may be integrated into a solid state drive (SSD) 50. The SSD 50 may further comprise an SSD connector 51 coupling the SSD 50 with the host computer 20.

Figure 4:
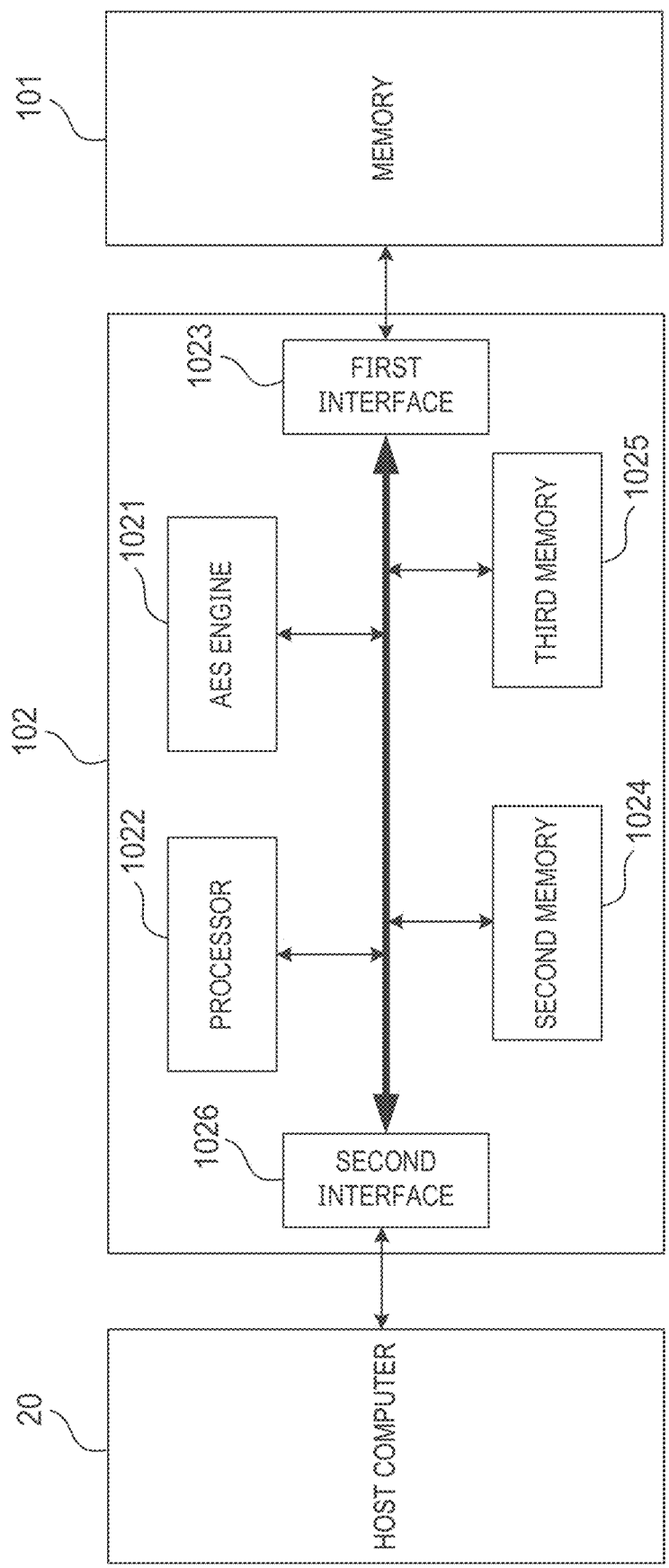
FIG. 4 is a schematic diagram of a memory controller 102 provided by examples of the present application.

As shown in FIG. 4, FIG. 4 is a schematic diagram of a memory controller 102 provided by examples of the present disclosure. The memory controller 102 may comprise an Advanced Encryption Standard (AES) engine 1021, a processor 1022, a first interface 1023, a second memory 1024, a third memory 1025, and a second interface 1026.

The AES engine 1021 may perform an encryption operation and a decryption operation of data. In some possible examples, the AES engine 1021 may decrypt the firmware obtained from the memory 101 to obtain a plaintext of the firmware. In addition, if the data in the firmware is changed or updated, the AES engine 1021 may also encrypt the changed or updated firmware to obtain a ciphertext of the firmware, so as to improve the safety of the firmware. In other possible examples, the AES engine 1021 may also encrypt or decrypt configuration information of the TCG in the firmware.

The processor 1022 may be communicatively connected with a first memory, e.g., the memory 101 described above, through the first interface 1023. The first interface 1023 may communicate with the memory 101 using a communication protocol according to control of the processor 1022, comprising communication of commands, addresses and data, and the processor 1022 may transmit data to be written to the memory 101 to the memory 101, or may receive data to be read from the memory 101 through the first interface 1023.

The processor 1022 may communicate with the host computer 20 through the second interface 1026, and perform logic operations to control operations of the memory controller 102. For example, the processor 1022 may load a program command, a data file, or a data interface, perform various operations, or generate commands and addresses in response to a request received from the host computer 20 or an external device. For example, the processor 1022 may generate various commands used to perform a program operation, a read operation, an erase operation, and a parameter setting operation. In some possible examples, the processor 1022 may obtain the firmware compiled by the host computer 20, and perform a write operation to write the firmware to the memory 101.

The second memory 1024 may be temporarily used to store the firmware, for example, the second memory 1024 may comprise a cache. The third memory 1025 may comprise one of a programmable read only memory (PROM), a programmable erasable read only memory, and a flash memory. In some possible examples, a private key may be stored in the third memory 1025, and the private key is used to decrypt encrypted data or to encrypt unencrypted data.

The second interface 1026 may transmit or receive data or commands to or from the host computer 20, for example, a command or data to be written to the memory 101 that is transmitted from the host computer 20 to the second interface 1026, etc., and a response to the command and data to be read from the memory 101 that is transmitted from the second interface 1026 to the host computer 20, etc. The second interface 1026 may further comprise a protocol used to exchange data between the host computer 20 and the memory controller 102. For example, the second interface 1026 may communicate with the host computer 20 through at least one of various interface protocols such as a Universal Serial Bus (USB) protocol, a Microsoft Management Console (MMC) protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Device Interface (ESDI) protocol, an Integrated Drive Electronic (IDE) protocol, and a Firewire protocol, etc.

Figure 5:
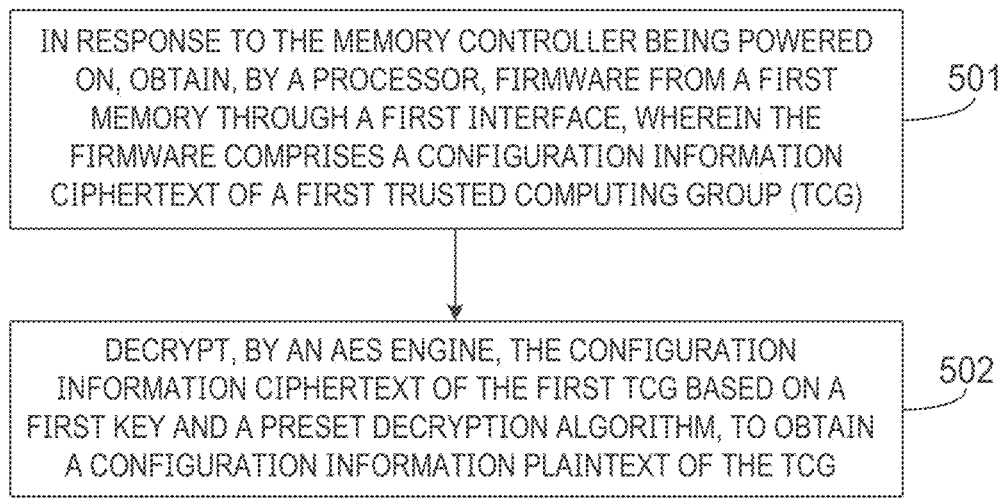
FIG. 5 is a flowchart of a method of operating a memory controller provided by examples of the present application.

Examples of the present disclosure provide a method of operating a memory controller, which is applied to the above memory controller. As shown in FIG. 5, FIG. 5 is a flowchart of a method of operating a memory controller provided by examples of the present disclosure. The method of operating the memory controller comprises the following operations.

Operation S501: In response to the memory controller being powered on, a processor obtains firmware from a first memory through a first interface, wherein the firmware comprises a configuration information ciphertext of a first trusted computing group (TCG).

In an example, when the memory controller is powered on, the firmware needs to be loaded and run. At this time, the firmware is stored in the first memory, and the processor may obtain the firmware needing to be loaded and run based on a physical address of the firmware. The processor may directly load the entire firmware in the first memory, or the processor may load the firmware in the first memory in batches, for example, the processor may load the configuration information ciphertext of the first TCG in the firmware first, and then load other portions in the firmware.

In an example, the configuration information ciphertext of the first TCG is data obtained by encrypting configuration information of the first TCG. In addition, the first TCG further comprises scene information of a user, etc. The configuration information of the first TCG may be understood as important information in the firmware, which can be directly obtained by technicians with relevant authorities. In addition, the scene information of the user and the like of the first TCG may be also encrypted. In order to further improve the safety of the firmware, the entire firmware may be also encrypted, which is not limited by the examples of the present disclosure.

Operation S502: An AES engine decrypts the configuration information ciphertext of the first TCG based on a first key and a preset decryption algorithm to obtain a configuration information plaintext of the TCG.

In an example, an application program based on a preset decryption algorithm may be disposed in the AES engine, and after the configuration information ciphertext of the first TCG and the first key are obtained, the configuration information ciphertext of the first TCG may be decrypted by using the first key.

The preset decryption algorithm may be one of a symmetric decryption algorithm, an asymmetric decryption algorithm, or a hash algorithm. The first key may comprise a public key, and the first key may further comprise a private key. In the symmetric decryption algorithm, keys for encryption and decryption are the same, that is, both the keys for encryption and decryption may be the public key. In the asymmetric decryption algorithm, the keys for encryption and decryption are different, that is, the key used for encryption may be the public key, and the key used for decryption may be the private key. The key is generated by the negotiation between a receiver and a sender, but may not be transmitted directly over a network, otherwise there will be a risk of key leakage.

In an example, the method further comprises: reading, by the processor, the first key from a third memory.

In an example, the first key may be stored in the third memory in advance, and additionally, the second key hereinafter may be also stored in the third memory in advance. If the configuration information ciphertext of the first TCG is decrypted by using the asymmetric decryption algorithm, the processor reads the private key from the third memory and transmits the private key to the AES engine. If the configuration information ciphertext of the first TCG is decrypted by using the symmetric decryption algorithm, the processor reads the public key from the third memory and transmits the public key to the AES engine.

In an example, the method further comprises: storing, by the processor, the firmware into a second memory, and determining, by the AES engine, the configuration information ciphertext of the first TCG from the second memory based on a logical address corresponding to the configuration information ciphertext of the first TCG.

In an example, a logic to physical mapping (L2P) table may be stored in the first memory, the processor may obtain the L2P of the part of the firmware and the firmware from the first memory based on the physical address of the firmware, and store the L2P of the part of the firmware and the firmware in the second memory, and the second memory may be understood as a memory of the memory controller. The AES engine may search the L2P to obtain the logical address of the configuration information ciphertext of the first TCG based on a physical address of the configuration information ciphertext of the first TCG, and then obtain the configuration information ciphertext of the first TCG from the second memory based on the logical address of the configuration information ciphertext of the first TCG, so as to decrypt the configuration information ciphertext of the first TCG.

If the processor performs loading in batches, the processor may obtain the configuration information ciphertext of the first TCG and the L2P of the configuration information ciphertext of the first TCG from the first memory based on the physical address of the configuration information ciphertext of the first TCG, and store the configuration information ciphertext of the first TCG and the L2P thereof in the second memory. The AES engine may search the L2P to obtain the logical address of the configuration information ciphertext of the first TCG based on a physical address of the configuration information ciphertext of the first TCG, and then obtain the configuration information ciphertext of the first TCG from the second memory based on the logical address of the configuration information ciphertext of the first TCG, so as to decrypt the configuration information ciphertext of the first TCG.

In an example, operation S502 may comprise: performing, by the AES engine, an operation on the configuration information ciphertext of the first TCG through an AES decryption function by using the first key, to obtain a configuration information plaintext of the TCG.

By taking the preset decryption algorithm being a symmetric decryption algorithm for example, the first key comprises a public key. If the AES decryption function is D, then $P=D(K, C)$, wherein C is the ciphertext, K is the key, and P is the plaintext. The configuration information plaintext of the TCG may be obtained by using the configuration information ciphertext of the first TCG and the first key as input parameters of the AES decryption function.

A length of the key (for example, the first key) may be 128 bits (b), 192 bits, or 256 bits. When the length of the key is different, a number of encryption rounds is also different. In some possible examples, if the length of the key is 128 bits, then the number of encryption rounds may be 10 rounds.

In an example, the decryption operation is an inverse operation of the encryption operation. In the decryption function, one round function is performed, and this round function is performed 10 times. The round functions from the first round to the ninth round of the decryption operation are the same, comprising 4 operations: reverse row shift, reverse byte substitution, round key addition, and reverse column mixing, and the reverse column mixing is not performed in the round function of the last round. In addition, before the round function of the first round starts to iterate, a key addition operation is performed to the ciphertext and the original key.

In an example, the method further comprises: in response to update of the configuration information plaintext of the TCG, encrypting, by the AES engine, the updated configuration information plaintext of the TCG based on a second key and a preset encryption algorithm, to obtain a configuration information ciphertext of a second TCG. The processor stores the firmware comprising the configuration information ciphertext of the second TCG to the first memory.

In an example, during the loading and running of the firmware, the configuration information plaintext of the TCG may be updated, and the AES engine may encrypt the updated configuration information plaintext of the TCG. The preset encryption algorithm may comprise one of a symmetric encryption algorithm, an asymmetric encryption algorithm, and a hash algorithm.

In an example, the processor reads the second key from the third memory.

In an example, the second key may comprise a public key. If the updated configuration information plaintext of the TCG needs to be encrypted, the processor may read the public key from the third memory and transmit the public key to the AES engine.

Continuing to take the preset encryption algorithm being a symmetric encryption algorithm for example, the configuration information plaintext of the TCG is divided into a plurality of groups, the length of each group is equal, and a group of data is encrypted each time until the entire configuration information plaintext of the TCG is encrypted. The length of the group may be 128 bits, that is, each group comprises 16 bytes (B).

If the AES encryption function is E, then C=E (K, P), wherein E is the AES encryption function, K is the key, P is the plaintext, and C is the ciphertext. In the encryption function E, one round function is performed, and this round function is performed 10 times. The plaintext group is represented by a state matrix, and the key is also represented by a matrix in bytes. The round functions from the first round to the ninth round of encryption are the same, comprising 4 operations: byte substitution, row displacement, column mixing, and round key addition and column mixing is not performed in the round function of the last round. In addition, before the round function of the first round starts to iterate, an XOR encryption operation is performed to the plaintext and the original key.

In addition, the preset decryption algorithm may further comprise an asymmetric encryption algorithm, e.g., the data is encrypted and decrypted by two keys, in which case the first key is a private key and the second key is a public key. The obtaining of the public key and the private key may comprise the following operations: (1) randomly selecting a prime pair N=(p, q), wherein both p and q are positive integers, and both p and q are prime numbers; (2) calculating an Euler number L=(p−1)*(q−1), e.g., calculating a least common multiple of p−1 and q−1; (3) calculating a common modulus E=p*q, wherein E satisfies that E is a number greater than 1 and less than L, and a greatest common divisor of E and L is 1; and (4) calculating a numerical value D, wherein D satisfies 1<D<L and E*DmodL=1. Thus, the public key is (E, N), and the private key is (D, N).

In an example, the processor obtains the firmware comprising the updated configuration information plaintext of the TCG from the second memory.

In an example, if a person with relevant authorities updates the configuration information plaintext of the TCG, the updated configuration information plaintext of the TCG should be encrypted again in order to ensure the safety of the firmware. The processor obtains the firmware comprising the updated configuration information plaintext of the TCG from the second memory for the AES engine to perform the encryption operation.

Figure 6:
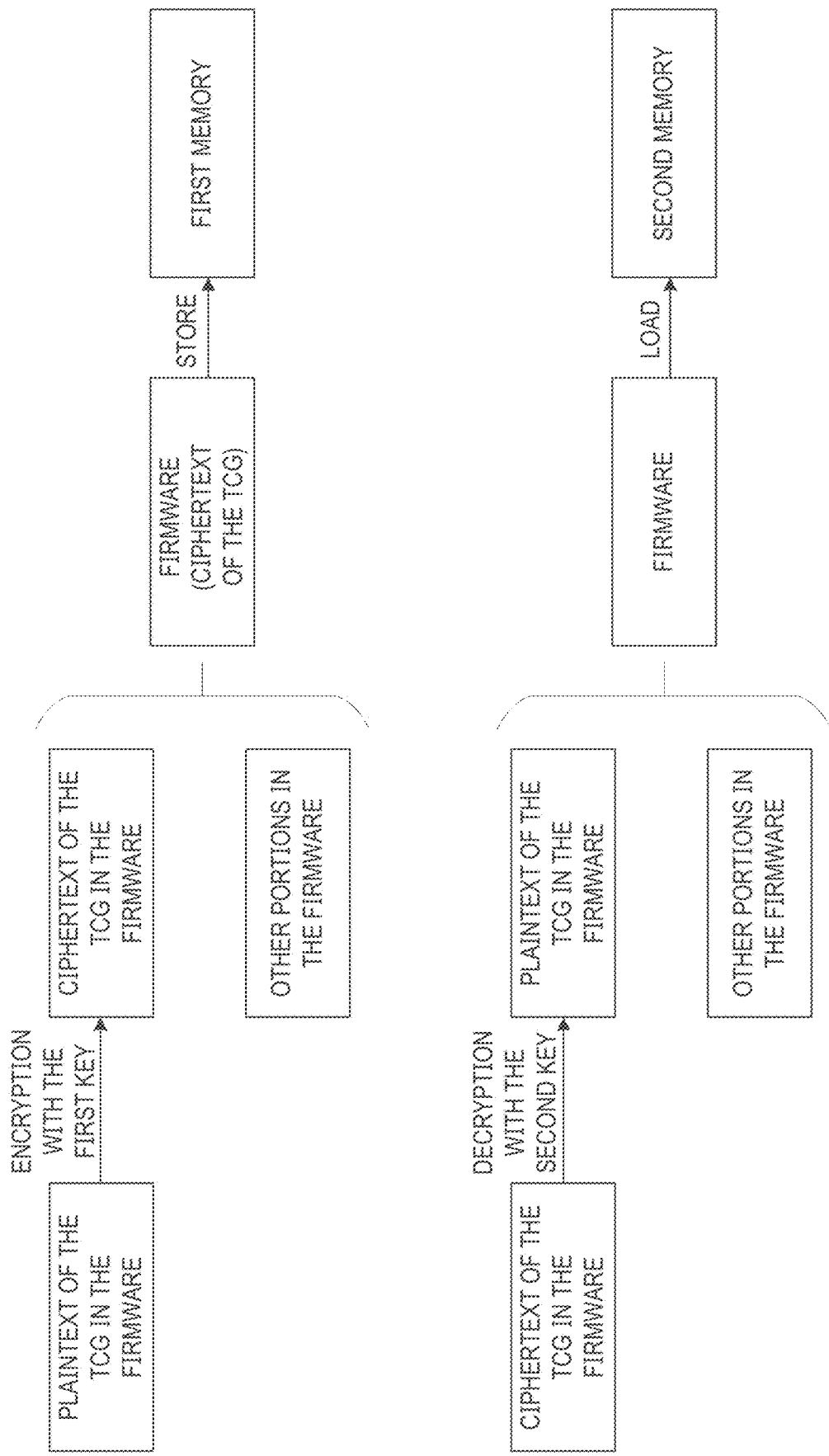
FIG. 6 is a flowchart of a memory controller performing a decryption operation of an encryption operation provided by examples of the present application.

As shown in FIG. 6, FIG. 6 is a flowchart of a memory controller performing a decryption operation of an encryption operation provided by examples of the present disclosure. The flow of the encryption operation may comprise: encrypting, by the AES engine, the plaintext of the TCG in the firmware based on the first key, to obtain the ciphertext of the TCG in the firmware, and assembling, by the processor, the ciphertext of the TCG in the firmware and other portions in the firmware, to obtain the firmware comprising the ciphertext of the TCG and storing the firmware comprising the ciphertext of the TCG in the first memory. In an example, the processor establishes a logic to physical mapping table for the ciphertext of the TCG in the firmware and the other portions in the firmware, and the processor stores the ciphertext of the TCG in the firmware in the first memory according to the physical address of the ciphertext of the TCG in the firmware and stores the other portions in the firmware in the first memory according to the physical address of the other portions in the firmware. In addition, the flow of the decryption operation may comprise: decrypting the ciphertext of the TCG in the firmware based on the second key, to obtain the plaintext of the TCG in the firmware. The plaintext of the TCG in the firmware and other portions in the firmware are assembled to obtain the firmware, and the firmware is loaded into the second memory and runs. The first key and the second key may be the same, or the first key and the second key may be different.

In an example, the first memory comprises a non-volatile flash memory.

Figure 7:
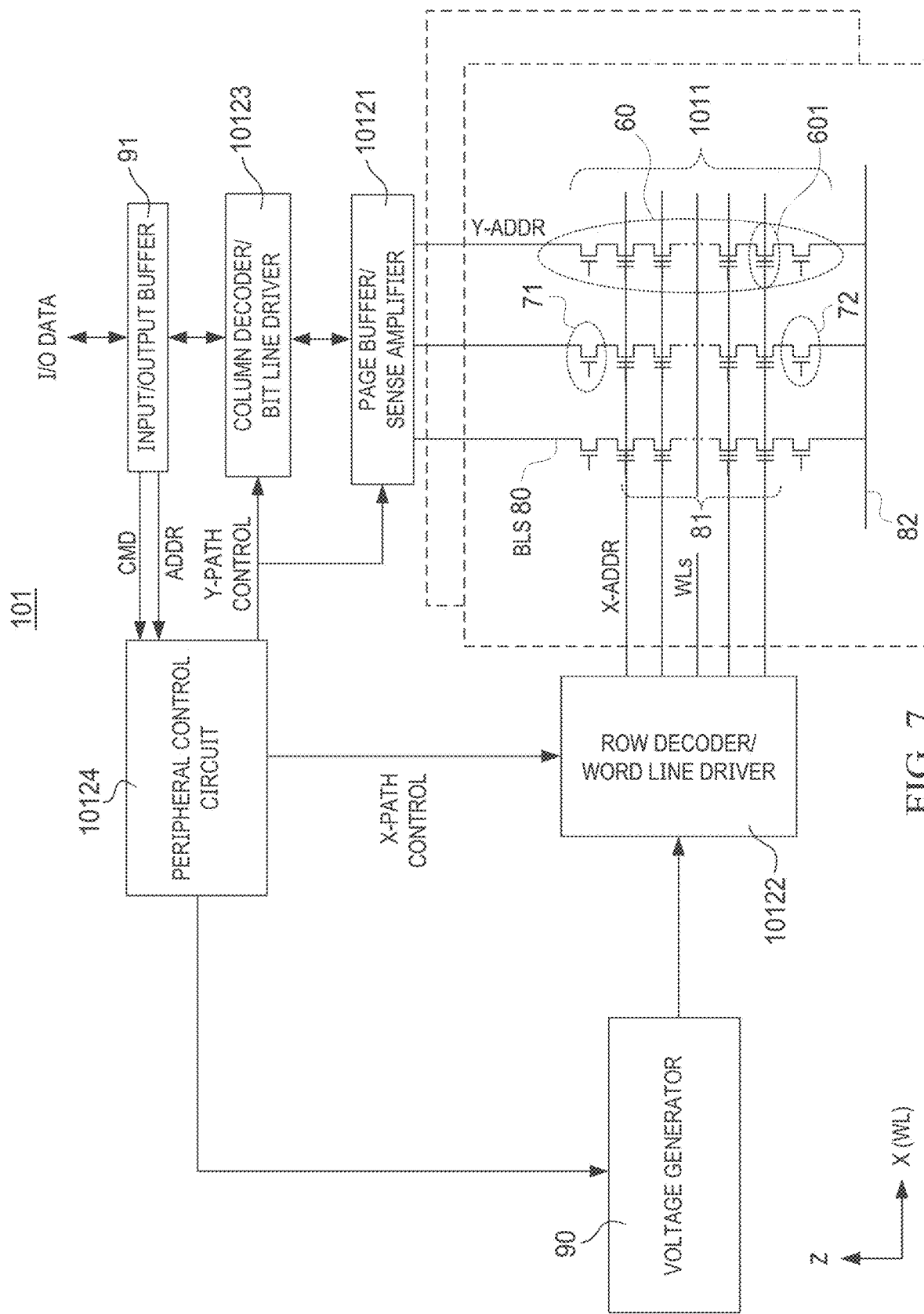
FIG. 7 is a schematic structural diagram of a memory 101 provided by examples of the present application.

As shown in FIG. 7, FIG. 7 is a schematic structural diagram of a memory 101 provided by examples of the present disclosure. The memory 101 comprises one or more memory blocks 1011. Each memory block 1011 comprises memory strings 60. Each memory string 60 comprises memory cells 601. The memory cells 601 sharing a same bit line form the memory string 60. The memory string 60 may further comprise at least one field-effect transistor (for example, a metal-oxide-semiconductor field-effect transistor (MOSFET)) at each end. The field-effect transistor is controlled by a top select transistor 71 and a bottom select transistor 72, respectively. A drain terminal of the top select transistor 71 may be connected to a bit line 80, and a source terminal of the bottom select transistor 72 may be connected to an array common source (ACS) 82. The ACS 82 may be shared by the memory strings 60 in the entire memory block 1011, and is also referred to as a common source line (SL).

In some examples, a peripheral circuit region 1012 of the memory 101 may support an erase operation of a GIDL assist technique. The memory block 1011 may be coupled with a row decoder/word line driver 10122 via the word line 81, the top select transistor 71, and the bottom select transistor 72. The memory block 1011 may be coupled with a page buffer/sense amplifier 10121 via a bit line 80. The row decoder/word line driver 10122 may select one of the memory blocks 1011 on the memory 101 in response to an X-path control signal provided by a peripheral control circuit 10124. The row decoder/word line driver 10122 may transfer a voltage provided from a voltage generator 90 to the word line 81 according to the X-path control signal. During read and program operations, the row decoder/word line driver 10122 may transfer a read voltage Vread and a program voltage Vpgm to a selected word line 81 and transfer a pass voltage Vpass to an unselected word line according to the X-path control signal received from the peripheral control circuit 10124.

A column decoder/bit line driver 10123 may transfer an inhibiting voltage Vinhibit to the unselected bit lines and connect the selected bit line 80 to ground according to a Y-path control signal received from the peripheral control circuit 10124. That is, the column decoder/bit line driver 10123 may be configured to select or unselect one or more memory strings 60 according to the Y-path control signal from the peripheral control circuit 10124. The page buffer/sense amplifier 10121 may be configured to read data from the memory block 1011 and program (write) data to the memory block 1011 according to the Y-path control signal from the peripheral control circuit 10124. For example, the page buffer/sense amplifier 10121 may store a page of data to be programmed to a memory page. In another example, the page buffer/sense amplifier 10121 may perform a verify operation to ensure that data has been properly programmed to each memory cell 601. In yet another example, during a read operation, the page buffer/sense amplifier 10121 may sense the current flowing through the bit line 80 reflecting a logic state (e.g., the data) of the memory cell 601, as well as amplify a small signal to a measurable signal amplification.

An input/output buffer 91 may transfer I/O data from/to the page buffer/sense amplifier 10121, and transfer an address ADDR signal or a command CMD signal to the peripheral control circuit 10124. In some examples, the input/output buffer 91 may serve as an interface between the memory controller 102 and the memory 101.

The peripheral control circuit 10124 may control the page buffer/sense amplifier 10121 and the row decoder/word line driver 10122 in response to a command CMD transferred by the input/output buffer 91. During a program operation, the peripheral control circuit 10124 may control the row decoder/word line driver 10122 and the page buffer/sense amplifier 10121 to program the selected memory cell 601. During a read operation, the peripheral control circuit 10124 may control the row decoder/word line driver 10122 and the page buffer/sense amplifier 10121 to read the selected memory cell 601. The X-path control signal comprises a row address X-ADDR, and the Y-path control signal comprises a column address Y-ADDR, both of which may be used to position the selected memory cell 601 in the memory block 1011. The row address X-ADDR may comprise a page index, a block index, and a plane index, so as to identify the memory page and the memory block 1011, respectively. The column address Y-ADDR may identify a byte or a word in the data of the memory page.

In some implementations, the peripheral control circuit 10124 may comprise one or more control logics. Each control logic described herein may be at least one of a software module or a firmware module running on the processor, for example, a microcontroller unit (MCU) as part of the peripheral control circuit 10124, or a hardware module of a finite-state machine (FSM), for example, an integrated circuit (IC), such as an application-specific IC (ASIC) and a field-programmable gate array (FPGA), etc. or a combination of the software module, the firmware module, and the hardware module.

The voltage generator 90 may generate voltages provided to the word line 81 and the bit line 80 under the control of the peripheral control circuit 10124. The voltage generated by the voltage generator 90 comprises a read voltage Vread, a program voltage Vpgm, a pass voltage Vpass, and an inhibiting voltage Vinhibit, etc.

In some examples, the memory 101 may be formed based on a floating gate technique. In some examples, the memory 101 may be formed based on a charge trapping technique. The memory 101 based on charge trapping may provide high storage density and high intrinsic reliability. The stored data or logic state (for example, a threshold voltage Vth of the memory cell 601) depends on an amount of charge trapped in a storage layer. In some examples, the memory 101 may comprise a three-dimensional (3D) memory apparatus in which the memory cells 601 may be vertically stacked on top of each other.

In some examples, when an erase operation is performed, all the memory cells 601 in the same memory block 1011 may be reset to the erase state (ER) as a logic "1" by implementing a negative voltage difference between the gate and the source terminals (for example, ACS 82) of the memory cell 601 such that all trapped electronic charge in the storage layer of the memory cell 601 may be removed. For example, the voltage difference may be induced by grounding a control gate in the memory cell 601 and applying a positive voltage to the ACS 82. In this example, a voltage pulse may be applied to the memory cell 601 in an erase operation.

Some examples of the present disclosure further provide an electronic apparatus. The electronic apparatus may be any one of a cellphone, a desktop computer, a tablet computer, a notebook computer, a server, a vehicle apparatus, a wearable apparatus (e.g., a smart watch, a smart bracelet, and smart glasses, etc.), a mobile power supply, a gaming machine, and a digital multimedia player, etc.

The electronic apparatus may comprise the memory system as described above, and may further comprise at least one of a Central Processing Unit (CPU) and a cache, etc.

The above descriptions are merely particular implementations of the present disclosure, and the scope of protection of the present disclosure is not limited thereto. Any variation or replacement that may be readily figured out by those skilled in the art within the technical scope disclosed by the present disclosure shall fall within the scope of protection of the present disclosure. Therefore, the scope of protection of the present disclosure should be defined by the scope of protection of the claims.

What is claimed is:

1. A method of operating a memory controller, wherein the memory controller comprises an Advanced Encryption Standard (AES) engine, a processor, a second memory, and a first interface, and the memory controller is communicatively connected with a first memory through the first interface, the method comprising:
    in response to the memory controller being powered on, obtaining, by the processor, firmware from the first memory through the first interface, wherein the firmware comprises a configuration information ciphertext of a first trusted computing group (TCG);
    decrypting, by the AES engine, the configuration information ciphertext of the first TCG based on a first key and a preset decryption algorithm, to obtain a configuration information plaintext of the TCG;
    storing, by the processor, the firmware in the second memory; and
    determining, by the AES engine, the configuration information ciphertext of the first TCG from the second memory based on a logical address corresponding to the configuration information ciphertext of the first TCG.

2. The method of claim 1, wherein the decrypting, by the AES engine, the configuration information ciphertext of the first TCG based on the first key and the preset decryption algorithm, to obtain the configuration information plaintext of the TCG comprises:
    performing, by the AES engine, an operation on the configuration information ciphertext of the first TCG through an AES decryption function by using the first key, to obtain the configuration information plaintext of the TCG.

3. The method of claim 1, wherein the memory controller further comprises a third memory in which the first key is stored, and the method further comprises:
    reading, by the processor, the first key from the third memory.

4. The method of claim 1, further comprising:
    in response to update of the configuration information plaintext of the TCG, encrypting, by the AES engine, the updated configuration information plaintext of the TCG based on a second key and a preset encryption algorithm, to obtain a configuration information ciphertext of a second TCG; and
    storing, by the processor, the firmware comprising the configuration information ciphertext of the second TCG to the first memory.

5. The method of claim 4, further comprising:
    obtaining, by the processor, the firmware comprising the updated configuration information plaintext of the TCG from the second memory.

6. The method of claim 4, wherein the memory controller further comprises a third memory storing the second key, and the method further comprises:
reading, by the processor, the second key from the third memory.

7. The method of claim 1, wherein the first memory comprises a non-volatile flash memory.

8. A memory controller, comprising:
an Advanced Encryption Standard (AES) engine;
a processor;
a second memory; and
a first interface,
wherein:
the memory controller is communicatively connected with a first memory through the first interface;
the processor is configured to, in response to the memory controller being powered on, obtain firmware from the first memory through the first interface and store the firmware in the second memory, wherein the firmware comprises a configuration information ciphertext of a first trusted computing group (TCG); and
the AES engine is configured to:
decrypt the configuration information ciphertext of the first TCG based on a first key and a preset decryption algorithm, to obtain a configuration information plaintext of the TCG; and
determine the configuration information ciphertext of the first TCG from the second memory based on a logical address corresponding to the configuration information ciphertext of the first TCG.

9. The memory controller of claim 8, wherein the AES engine is further configured to:
perform an operation on the configuration information ciphertext of the first TCG through an AES decryption function by using the first key, to obtain the configuration information plaintext of the TCG.

10. The memory controller of claim 8, further comprising a third memory in which the first key is stored, and the processor is further configured to:
read the first key from the third memory.

11. The memory controller of claim 8, wherein the AES engine is further configured to:
in response to update of the configuration information plaintext of the TCG, encrypt the updated configuration information plaintext of the TCG based on a second key and a preset encryption algorithm, to obtain a configuration information ciphertext of a second TCG; and
the processor is further configured to store the firmware comprising the configuration information ciphertext of the second TCG to the first memory.

12. The memory controller of claim 11, wherein the processor is further configured to:
obtain the firmware comprising the updated configuration information plaintext of the TCG from the second memory.

13. The memory controller of claim 11, further comprising a third memory storing the second key, and the processor is further configured to:
read the second key from the third memory.

14. The memory controller of claim 8, wherein the first memory comprises a non-volatile flash memory.

15. A memory system, comprising:
a memory controller, comprising:
an Advanced Encryption Standard (AES) engine;
a processor;
a second memory; and
a first interface,
wherein:
the memory controller is communicatively connected with a first memory through the first interface;
the processor is configured to in response to the memory controller being powered on, obtain firmware from the first memory through the first interface and store the firmawre in the second memory, wherein the firmware comprises a configuration information ciphertext of a first trusted computing group (TCG); and
the AES engine is configured to:
decrypt the configuration information ciphertext of the first TCG based on a first key and a preset decryption algorithm, to obtain a configuration information plaintext of the TCG; and
determine the configuration information ciphertext of the first TCG from the second memory based on a logical address corresponding to the configuration information ciphertext of the first TCG; and
one or more first memories coupled with the memory controller.

16. The memory system of claim 15, wherein the AES engine is further configured to:
perform an operation on the configuration information ciphertext of the first TCG through an AES decryption function by using the first key, to obtain the configuration information plaintext of the TCG.

17. The memory system of claim 15, wherein the memory controller further comprises a third memory in which the first key is stored, and the processor is further configured to:
read the first key from the third memory.

18. The memory system of claim 15, wherein the AES engine is further configured to:
in response to update of the configuration information plaintext of the TCG, encrypt the updated configuration information plaintext of the TCG based on a second key and a preset encryption algorithm, to obtain a configuration information ciphertext of a second TCG; and
the processor is further configured to store the firmware comprising the configuration information ciphertext of the second TCG to the first memory.

19. The memory system of claim 18, wherein the processor is further configured to:
obtain the firmware comprising the updated configuration information plaintext of the TCG from the second memory.

20. The memory system of claim 18, further comprising a third memory storing the second key, and the processor is further configured to:
read the second key from the third memory.

* * * * *